United States Patent
Iikura et al.

(10) Patent No.: US 9,465,687 B2
(45) Date of Patent: Oct. 11, 2016

(54) INFORMATION PROCESSING APPARATUS AND INFORMATION PROCESSING METHOD

(71) Applicant: FUJITSU LIMITED, Kawasaki-shi, Kanagawa (JP)

(72) Inventors: Fumi Iikura, Shinagawa (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/613,862

(22) Filed: Feb. 4, 2015

(65) Prior Publication Data

US 2015/0278006 A1    Oct. 1, 2015

(30) Foreign Application Priority Data

Mar. 27, 2014  (JP) ................................. 2014-066174

(51) Int. Cl.
  *G06F 11/00*    (2006.01)
  *G06F 11/07*    (2006.01)

(52) U.S. Cl.
  CPC ....... *G06F 11/0793* (2013.01); *G06F 11/0706* (2013.01); *G06F 11/079* (2013.01)

(58) Field of Classification Search
  CPC ............. G06F 11/0706; G06F 11/079; G06F 11/0793
  See application file for complete search history.

(56) References Cited

U.S. PATENT DOCUMENTS

| | | | | |
|---|---|---|---|---|
| 8,726,090 B2* | 5/2014 | Aoki | ................. | G03G 15/5079 714/38.14 |
| 8,839,234 B1* | 9/2014 | Voronkov | ............... | G06F 9/445 717/172 |
| 9,396,060 B2* | 7/2016 | Tsujide | ............... | G06F 11/0793 |
| 2003/0070114 A1 | 4/2003 | Yasuda | | |
| 2005/0283638 A1 | 12/2005 | Kato | | |

FOREIGN PATENT DOCUMENTS

| | | |
|---|---|---|
| JP | 2003-114811 | 4/2003 |
| JP | 2005-346331 | 12/2005 |

* cited by examiner

*Primary Examiner* — Joshua P Lottich
(74) *Attorney, Agent, or Firm* — Staas & Halsey LLP

(57) ABSTRACT

A computer obtains, from a device having software installed therein, a software identifier for identifying the software, an error identifier for identifying an error which occurs during installation of the software, prior configuration data of the device at a time when the error occurs, and posterior configuration data of the device at a time when the error is resolved. The computer generates new handling data on basis of a difference between the prior configuration data and the posterior configuration data. The computer updates the new handling data on basis of existing handling data, the prior configuration data, and the posterior configuration data to store the updated handling data in a storing unit in association with the software identifier and the error identifier. The existing handling data is stored in the storing unit in association with the software identifier and includes a handling item to be performed for installing the software.

7 Claims, 39 Drawing Sheets

| PACKAGE NAME | VERSION |
|:---:|:---:|
| libxyz | 5.1 |
| opendb | 4.2 |
| appto | 1.5 |

| COMPONENT NAME | PARAMETER | VALUE |
|---|---|---|
| opendb | passwd | secret |
| appto | connectto | localhost:3360 |
| appto | dbpasswd | secret |

FIG. 5

| TIME STAMP | LOG OF appto | HANDLING ITEM OF PACKAGE MANAGEMENT | HANDLING ITEM OF CONFIGURATION INFORMATION |
|---|---|---|---|
| 2013/6/7 10:15 | | Install libxyz-5.1 | |
| 2013/6/7 10:16 | | Install opendb-4.2 | |
| 2013/6/7 10:17 | | | opendb, passwd=secret |
| 2013/6/7 10:19 | | Install appto-1.5 | |
| 2013/6/7 10:20 | | | appto, connectto=localhost:3360 |
| 2013/6/7 10:21 | | | appto, dbpasswd=secret |
| 2013/6/7 10:22 | [info] preparing | | |
| 2013/6/7 10:23 | [info] starting | | |

| PACKAGE NAME | VERSION |
|---|---|
| opendb | 4.2 |
|  |  |
|  |  |

FIG. 7

| TIME STAMP | LOG OF appto | HANDLING ITEM OF PACKAGE MANAGEMENT | HANDLING ITEM OF CONFIGURATION INFORMATION |
|---|---|---|---|
| 2013/6/7 10:15 | | Install appto-1.5 | |
| 2013/6/7 10:16 | [info] preparing<br>[error] missing library | | |
| 2013/6/7 10:17 | | Install libxyz-5.1 | |
| 2013/6/7 10:18 | | Install libabc-3.3 | |
| 2013/6/7 10:19 | [error] could not connect to database | | |
| 2013/6/7 10:20 | | | opendb, passwd=secret |
| 2013/6/7 10:21 | | | appto, connectto=localhost:3360 |
| 2013/6/7 10:22 | | | appto, dbpasswd=secret |
| 2013/6/7 10:23 | [info] starting | | |

| PACKAGE NAME | VERSION |
|:---:|:---:|
| opendb | 4.2 |
| appto | 1.5 |
| libxyz | 5.1 |
| libabc | 3.3 |

| COMPONENT NAME | PARAMETER | VALUE |
|---|---|---|
| opendb | passwd | secret |
| appto | connectto | localhost:3360 |
| appto | dbpasswd | secret |
|  |  |  |

| PACKAGE NAME | VERSION |
|---|---|
| opendb | 4.2 |
| libxyz | 5.1 |
| | |
| | |

FIG. 11

| TIME STAMP | LOG OF appto | HANDLING ITEM OF PACKAGE MANAGEMENT | HANDLING ITEM OF CONFIGURATION INFORMATION |
|---|---|---|---|
| 2013/6/7 10:15 | | | opendb, passwd=secret |
| 2013/6/7 10:16 | | Install appto-1.5 | |
| 2013/6/7 10:17 | | | appto, connectto=localhost:3360 |
| 2013/6/7 10:18 | [info] preparing<br>[error] could not connect to database | | |
| 2013/6/7 10:19 | | | appto, dbpasswd=secuir |
| 2013/6/7 10:20 | [error] could not connect to database | | |
| 2013/6/7 10:21 | | | appto, dbpasswd=secret |
| 2013/6/7 10:22 | [info] starting | | |

| PACKAGE NAME | VERSION |
|:---:|:---:|
| opendb | 4.2 |
| libxyz | 5.1 |
| appto | 1.5 |
|  |  |

| COMPONENT NAME | PARAMETER | VALUE |
|---|---|---|
| opendb | passwd | secret |
| appto | connectto | localhost:3360 |
| appto | dbpasswd | secret |
| | | |

FIG. 17

| USER/SERVER | u0500, i1000 | | |
|---|---|---|---|
| SOFTWARE NAME | appto | | |
| ERROR MESSAGE | missing library | | |
| CONFIGURATION DATA BEFORE HANDLING | PACKAGE NAME | VERSION | |
| | COMPONENT NAME | PARAMETER | VALUE |
| CONFIGURATION DATA AFTER HANDLING | PACKAGE NAME | VERSION | |
| | COMPONENT NAME | PARAMETER | VALUE |

| PACKAGE NAME | VERSION |
|---|---|
| opendb | 4.2 |
| appto | 1.5 |
|  |  |
|  |  |

305

| COMPONENT NAME | PARAMETER | VALUE |
|---|---|---|
|  |  |  |
|  |  |  |
|  |  |  |

| PACKAGE NAME | VERSION |
|---|---|
| opendb | 4.2 |
| libxyz | 5.1 |
| libabc | 3.3 |
| appto | 1.5 |

305

| COMPONENT NAME | PARAMETER | VALUE |
|---|---|---|
|  |  |  |
|  |  |  |
|  |  |  |

| PACKAGE NAME | VERSION |
|---|---|
| opendb | 4.2 |
| libxyz | 5.1 |
| libabc | 3.3 |
| appto | 1.5 |

305

| COMPONENT NAME | PARAMETER | VALUE |
|---|---|---|
|  |  |  |
|  |  |  |
|  |  |  |

| PACKAGE NAME | VERSION |
|---|---|
| opendb | 4.2 |
| libxyz | 5.1 |
| libabc | 3.3 |
| appto | 1.5 |

305

| COMPONENT NAME | PARAMETER | VALUE |
|---|---|---|
| opendb | passwd | secret |
| appto | connectto | localhost:3360 |
| appto | dbpasswd | secret |

| PACKAGE NAME | VERSION |
|---|---|
| opendb | 4.2 |
| libxyz | 5.1 |
| appto | 1.5 |

305

| COMPONENT NAME | PARAMETER | VALUE |
|---|---|---|
| opendb | passwd | secret |
| appto | connectto | localhost:3360 |
|  |  |  |

| PACKAGE NAME | VERSION |
|---|---|
| opendb | 4.2 |
| libxyz | 5.1 |
| appto | 1.5 |

305

| COMPONENT NAME | PARAMETER | VALUE |
|---|---|---|
| opendb | passwd | secret |
| appto | connectto | localhost:3360 |
| appto | dbpasswd | secret |

FIG. 25

| SOFTWARE NAME | appto |
|---|---|
| ERROR MESSAGE | "missing library" |
| HANDLING ITEM 1 | Install libxyz-5.1 |
| HANDLING ITEM 2 | install libabc-3.3 |

FIG. 26

| SOFTWARE NAME | appto |
|---|---|
| ERROR MESSAGE | "could not connect to database" |
| HANDLING ITEM 1 | opendb, passwd=secret |
| HANDLING ITEM 2 | appto, connectto=localhost:3360 |
| HANDLING ITEM 3 | appto, dbpasswd=secret |

FIG. 27

| SOFTWARE NAME | appto |
|---|---|
| ERROR MESSAGE | "could not connect to database" |
| HANDLING ITEM 1 | appto, dbpasswd=secret |

FIG. 28

| SOFTWARE NAME | appto |
|---|---|
| ERROR MESSAGE | "could not connect to database" |
| HANDLING ITEM 1 | opendb, passwd=secret |
| HANDLING ITEM 2 | appto, connectto=localhost:3360 |
| HANDLING ITEM 3 | appto, dbpasswd=secret |

FIG. 29

| SOFTWARE NAME | appto |
|---|---|
| ERROR MESSAGE | "could not connect to database" |
| HANDLING ITEM 1 | opendb, port=3360 |
| HANDLING ITEM 2 | appto, connectto=localhost:3360 |

FIG. 30

| SOFTWARE NAME | appto |
|---|---|
| ERROR MESSAGE | "could not connect to database" |
| HANDLING ITEM 1 | opendb, passwd=secret |
| HANDLING ITEM 2 | opendb, port=3360 |
| HANDLING ITEM 3 | appto, connectto=localhost:3360 |
| HANDLING ITEM 4 | appto, dbpasswd=secret |

FIG. 32

| SOFTWARE NAME | appto |
|---|---|
| ERROR MESSAGE | "missing library" |
| HANDLING ITEM 1 | Install libxyz-5.1 |

FIG. 33

| SOFTWARE NAME | appto |
|---|---|
| ERROR MESSAGE | "could not connect to database" |
| HANDLING ITEM 1 | opendb, passwd=%s |
| HANDLING ITEM 2 | appto, connectto=localhost:3360 |
| HANDLING ITEM 3 | appto, dbpasswd=%s |

FIG. 34

| COMPONENT NAME | PARAMETER | VALUE |
|---|---|---|
| opendb | passwd | secret |

FIG. 35

| COMPONENT NAME | PARAMETER | VALUE |
|---|---|---|
| opendb | passwd | secret |
| appto | connectto | localhost:3360 |

# INFORMATION PROCESSING APPARATUS AND INFORMATION PROCESSING METHOD

CROSS-REFERENCE TO RELATED APPLICATION

This application is based upon and claims the benefit of priority from the prior Japanese Patent Application No. 2014-066174 filed on Mar. 27, 2014, the entire contents of which are incorporated herein by reference.

FIELD

The embodiments discussed herein are related to an information processing apparatus and an information processing method.

BACKGROUND

When installing new software for the first time, an error message may be output due to an erroneous installation sequence or an erroneous parameter setting. When a handling strategy for an error message of the new software is unclear, an operator may generally search for the handling strategy through the Internet or the like to find out the handling strategy. However, it is difficult to promptly reach an appropriate handling strategy because it is difficult to find out the handling strategy or the error may not be resolved even if the handling strategy is found.

There is a technique which accumulates handling strategies for errors at the time of implementation of software to reuse the handling strategies, but a technique which focuses on errors occurring at the time of installation of software is not found. At the time of installation, for example, an error may occur due to an insufficient software configuration. However, at the time of implementation, an error due to an insufficient software configuration rarely occurs. For an operator who does not have knowledge on the software to be installed, it is preferable to present a handling strategy for the operator, regardless of the state of the software configuration required when the software is installed.

Related techniques are disclosed in, for example, Japanese Laid-Open Patent Publication No. 2005-346331 and Japanese Laid-Open Patent Publication No. 2003-114811.

SUMMARY

According to an aspect of the present invention, provided is an information processing method. In the information processing method, a computer obtains, from a device having software installed therein, a software identifier for identifying the software, a first error identifier for identifying an error which occurs during installation of the software, prior configuration data of the device at a first time when the error occurs, and posterior configuration data of the device at a second time when the error is resolved. The computer generates new handling data on basis of a difference between the prior configuration data and the posterior configuration data. The computer updates the new handling data on basis of existing handling data, the prior configuration data, and the posterior configuration data to store the updated handling data in a storing unit in association with the software identifier and the first error identifier. The existing handling data is stored in the storing unit in association with the software identifier and includes a handling item to be performed for installing the software. The computer stores, when the existing handling data is not stored in the storing unit, the new handling data in the storing unit in association with the software identifier and the first error identifier.

The objects and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of data stored in a package management DB;

FIG. 4 is a diagram illustrating an example of data stored in a configuration DB;

FIG. 5 is a diagram illustrating a relationship between log data, a package management DB, and a configuration DB;

FIG. 6 is a diagram illustrating an example of initial data stored in a package management DB;

FIG. 7 is a diagram illustrating a relationship between log data, a package management DB, and a configuration DB;

FIG. 8 is a diagram illustrating an example of data stored in a package management DB;

FIG. 9 is a diagram illustrating an example of data stored in a configuration DB;

FIG. 10 is a diagram illustrating an example of initial data stored in a package management DB;

FIG. 11 is a diagram illustrating a relationship between log data, a package management DB, and a configuration DB;

FIG. 12 is a diagram illustrating an example of data stored in a package management DB;

FIG. 13 is a diagram illustrating an example of data stored in a configuration DB;

FIG. 17 is a diagram illustrating an example of a format of data transmitted from a server to an operational management server;

FIG. 18 is a diagram illustrating an example of configuration data in handling 1 when an error occurs;

FIG. 19 is a diagram illustrating an example of configuration data in handling 1 when an error is resolved;

FIG. 20 is a diagram illustrating an example of configuration data in handling 2 when an error occurs;

FIG. 21 is a diagram illustrating an example of configuration data in handling 2 when an error is resolved;

FIG. 22 is a diagram illustrating an example of configuration data in handling 3 when an error occurs;

FIG. 23 is a diagram illustrating an example of configuration data in handling 3 when an error is resolved;

FIG. 25 is a diagram illustrating initial handling data for handling 1;

FIG. 26 is a diagram illustrating initial handling data for handling 2;

FIG. 27 is a diagram illustrating initial handling data for handling 3;

FIG. 28 is a diagram illustrating an example of updated handling data;

FIG. 29 is a diagram illustrating initial handling data for handling 4;

FIG. 30 is a diagram illustrating an example of updated handling data;

FIG. 32 is a diagram illustrating an example of updated handling data;

FIG. 33 is a diagram illustrating an example of handling data registered in a handling DB;

FIG. 34 is a diagram illustrating configuration data of a device;

FIG. 35 is a diagram illustrating configuration data of a device;

DESCRIPTION OF EMBODIMENT

Figure 1:
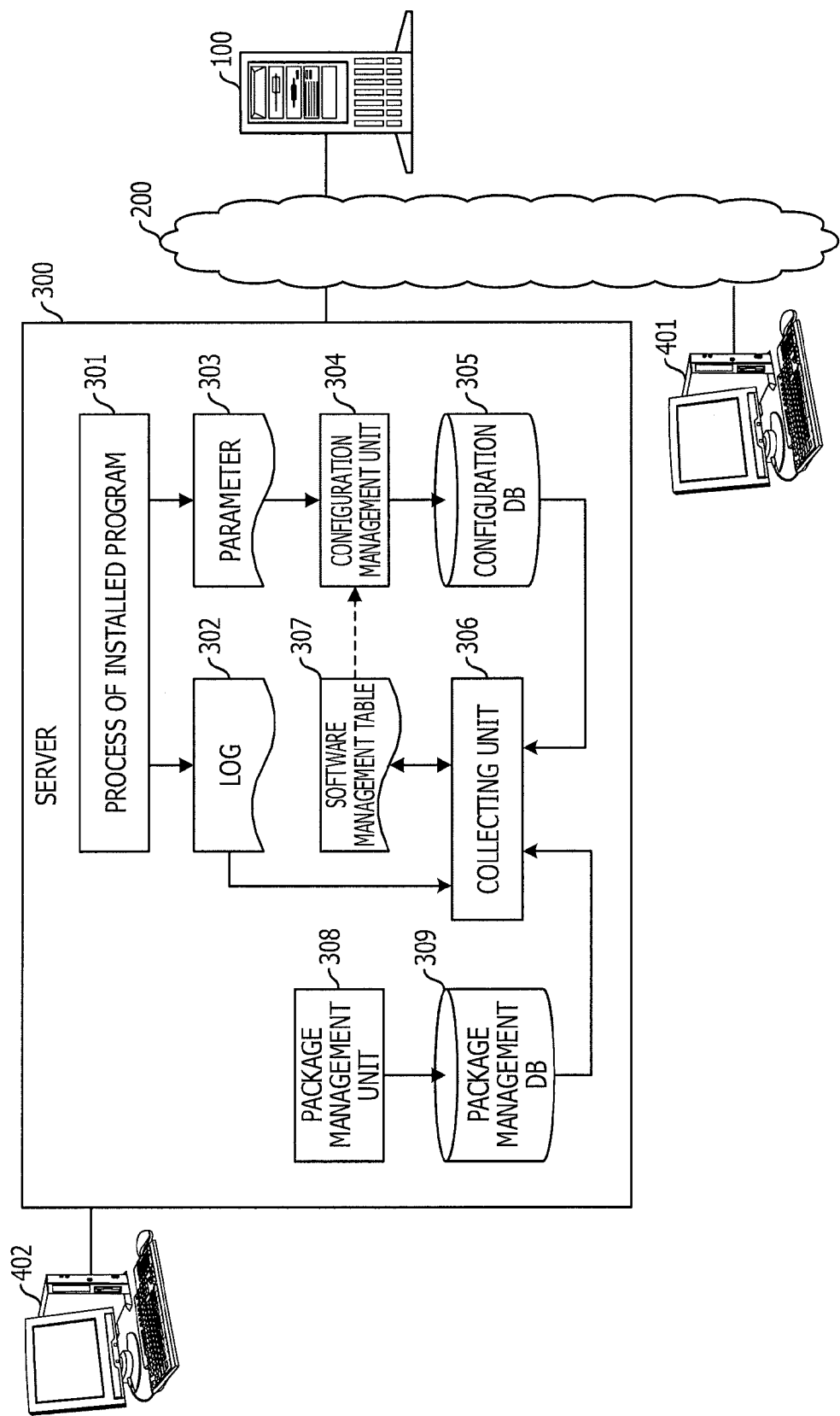
FIG. 1 is a diagram illustrating a configuration of a system according to an embodiment.

FIG. 1 illustrates an exemplary configuration of a system according to an embodiment. An operational management server 100 which performs major processes according to the present embodiment and one or a plurality of servers 300 in which an arbitrary software package is installed are connected through a network 200. A user terminal 401 and a user terminal 402 (collectively referred to as a user terminal 400) are terminal devices manipulated by a user when a software package is installed in the server 300. Some of the user terminals (the user terminal 401 for example) are connected to the network 200. Some of the user terminals (the user terminal 402 for example) are connected to the server 300. When an error occurs at the time of installation, an operator causes the user terminal 400 to access the operational management server 100 to obtain handling strategy data.

The server 300 includes a collecting unit 306, a configuration management unit 304, a package management unit 308, a configuration database (DB) 305, and a package management DB 309.

The operator of the user terminal 400 installs the software package in the server 300. At the time of installation, for example, the collecting unit 306 receives a notification from a process of an operating system (OS). The collecting unit 306 then obtains data for a log output destination (a log file 302 for example) of a process 301 of a program included in the software package and a storing location (a parameter file 303 for example) of a parameter, from package information of the software package to register the obtained data in a software management table 307. According to the present embodiment, since log data output by the process 301 is monitored, when the log output destination is not identified, the collecting unit 306 does not register the data of the software package in the software management table 307. Further, when the data of the parameter storing location is not obtained, the collecting unit 306 does not register the data of the software package in the software management table 307.

The configuration management unit 304 identifies a parameter storing location (the parameter file 303 for example) of the process 301 with reference to the software management table 307, reads out the parameter from the parameter storing location, and stores the parameter in the configuration DB 305. The configuration management unit 304 may read out the parameter from a parameter storing location which is separately obtained, rather than the software management table 307, to store the parameter in the configuration DB 305. For example, the package management unit 308 obtains data of the installed software package from a process of the OS to store the data in the package management DB 309.

Upon detecting occurrence of an error with reference to the log data read out from the log output destination, the collecting unit 306 reads out the configuration data from the configuration DB 305 and the package management DB 309. Upon detecting resolution of the error with reference to the log data, the collecting unit 306 reads out the configuration data from the configuration DB 305 and the package management DB 309 again. Then the collecting unit 306 transmits a software package name, an error message (corresponding to an identifier of the error), configuration data at the error occurrence, and configuration data at the error resolution to the operational management server 100. Further, when an error occurs or at predetermined regular times, the collecting unit 306 reads out configuration data from the configuration DB 305 and the package management DB 309 to transmit the configuration data to the operational management server 100.

Figure 2:
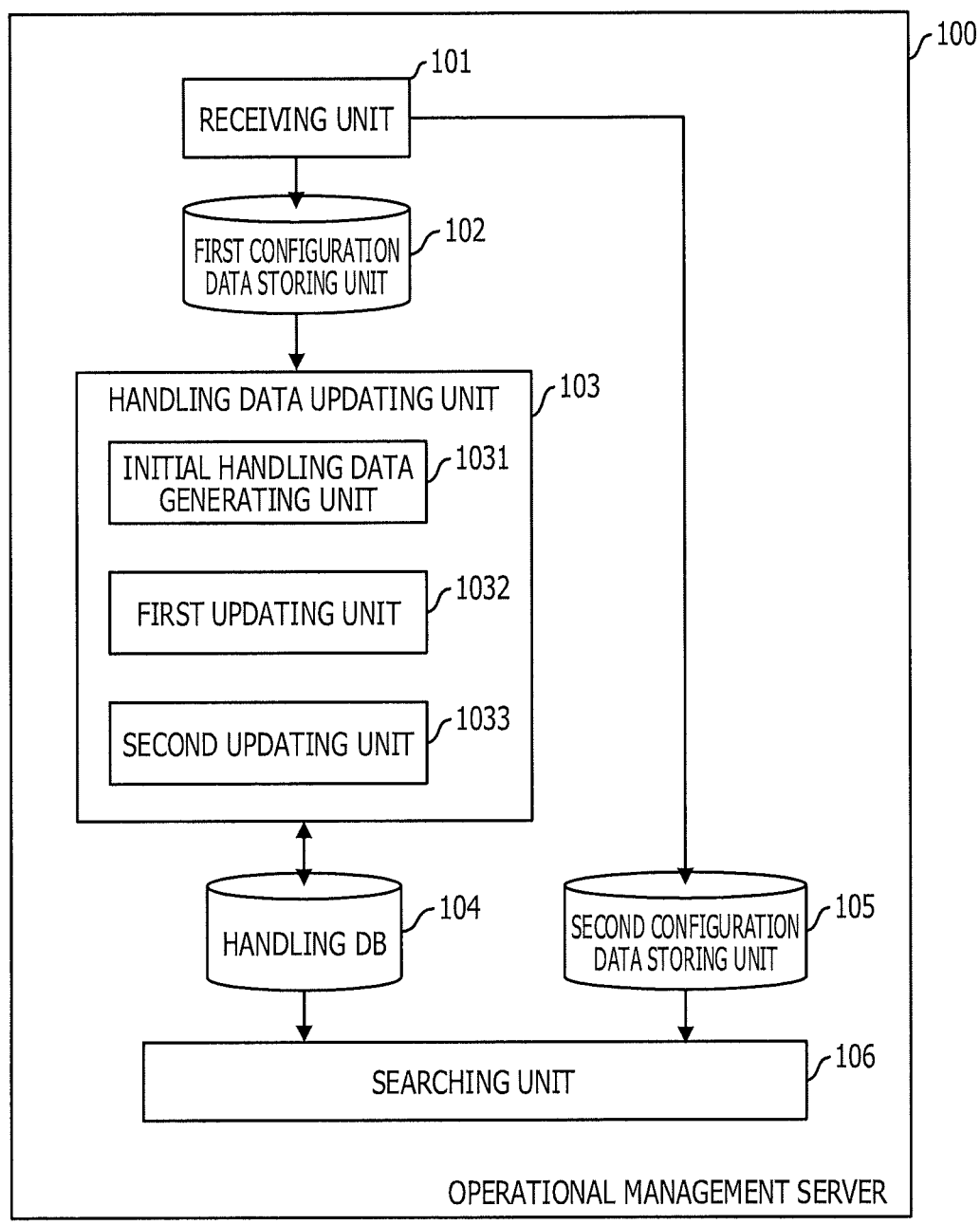
FIG. 2 is a diagram illustrating an exemplary functional configuration of an operational management server.

FIG. 2 illustrates a functional configuration of the operational management server 100. The operational management server 100 includes a receiving unit 101, a first configuration data storing unit 102, a handling data updating unit 103, a handling DB 104, a second configuration data storing unit 105, and a searching unit 106.

Upon receiving the configuration data at the error occurrence and the error resolution from each server 300, the receiving unit 101 stores the received configuration data in the first configuration data storing unit 102. Upon receiving configuration data at an arbitrary timing, the receiving unit 101 stores the received configuration data in the second configuration data storing unit 105.

The handling data updating unit 103 includes an initial handling data generating unit 1031, a first updating unit 1032, and a second updating unit 1033.

The initial handling data generating unit 1031 generates initial handling data from the configuration data at the error occurrence and the error resolution stored in the first configuration data storing unit 102. The first updating unit 1032 updates handling data for the same error message of the same software package, which is already registered in the handling DB 104, to the initial handling data. The second updating unit 1033 updates handling data for a current error message with handling data for a different error message of the same software package, which is already registered in the handling DB 104.

Upon receiving a search request including an identifier of a software package, an error message, and an identifier (including a user identifier when configuration varies for individual users) of a server 300 from the user terminal 400, the searching unit 106 extracts candidates of a handling item to be performed from the handling data stored in the handling DB 104 and the configuration data stored in the second configuration data storing unit 105 to send a reply to the user terminal 400.

Next, a specific example of an installation sequence performed on the server 300 will be described with reference to FIGS. 3 to 13.

Here, a case of introducing a software package "appto" will be described. When "appto" is introduced, the following sequence is executed.

(1) Install "libxyz-5.1"
(2) Install "opendb"
(3) Set a password ("secret" for example) of "opendb"
(4) Start "opendb"
(5) Install "appto"
(6) Set "localhost: 3360" to "connectto" parameter of "appto"
(7) Set "dbpasswd" parameter (same password as (3)) of "appto"
(8) Start "appto"

When a correct operation is performed as described above, data as illustrated in FIG. 3 is stored in the package management DB 309 in the order of installed software packages. In the example of FIG. 3, a software package name and a version thereof are registered. Data corresponding to (1), (2), and (5) mentioned above is registered.

Further, data as illustrated in FIG. 4 is registered in the configuration DB 305 in the order of manipulation. In the example of FIG. 4, a component name, a parameter, and a value of the parameter are registered. Data for (3), (6), and (7) mentioned above is registered.

A correspondence relationship between the log file 302 and data stored in the package management DB 309 and the configuration DB 305 will be illustrated in FIG. 5.

Since no error occurs in the above-mentioned example, only "[info] preparing" and "[info] starting" are registered in the log file 302 of "appto" in response to (8) Start "appto". Data corresponding to (1), (2), and (5) is registered in the package management DB 309, as described above. Accordingly, from the package management DB 309, a handling item "Install libxyz-5.1" which is a manipulation corresponding to (1), a handling item "Install opendb-4.2" which is a manipulation corresponding to (2), and a handling item "Install appto-1.5" which is a manipulation corresponding to (5) are obtained.

Data corresponding to (3), (6), and (7) is registered in the configuration DB 305, as described above. Accordingly, from the configuration DB 305, a handling item "opendb, passwd=secret" which is a manipulation corresponding to (3), a handling item "appto, connectto=localhost:3360" which is a manipulation corresponding to (6), and a handling item "appto, dbpasswd=secret" which is a manipulation corresponding to (7) are obtained.

Figure 6:
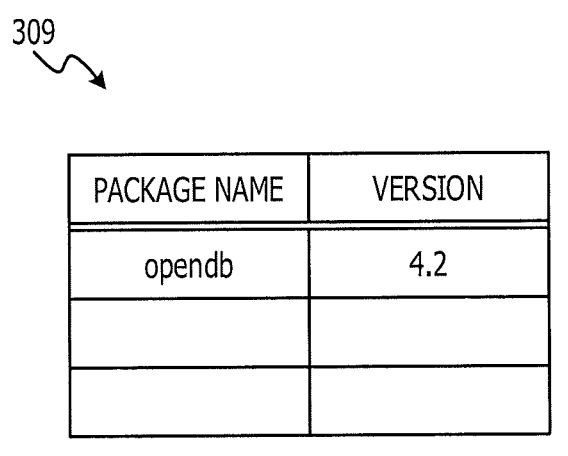

A case where the manipulation is not correctly performed will be described as well. For example, a case will be described in which (1) Install "libxyz-5.1" is neglected, (3) Set a password of "opendb" is neglected, and "libabc-3.3" is installed by accident. In this example, it is further assumed that the installation of "opendb" has been completed. That is, at the time of 10:14, the package management DB 309 is in a state as illustrated in FIG. 6.

FIG. 7 illustrates log data of "appto". In this example, since "appto-1.5" is installed at 10:15 and "appto" is started promptly, an error message "missing library" is registered in the log data of "appto". In response to this error message, the operator installs "libxyz-5.1" at 10:17 and also installs "libabc-3.3" at 10:18. Therefore, data as illustrated in FIG. 8 is stored in the package management DB 309. At this time, two handling items as illustrated in FIG. 7 are obtained from the package management DB 309 except for installation of the packages already installed.

Since "appto" is started again at 10:19, an error message "could not connect to database" is registered in the log data of "appto". In response to this error message, the operator sets parameters for "opendb" and "appto". Thus, data as illustrated in FIG. 9 is stored in the configuration DB 305.

When "appto" is started in this state, log data of "[info] starting" is stored at 10:23. This indicates that the error is resolved.

Another example will be described. For example, as illustrated in FIG. 10, it is assumed that the installation of "opendb" and "libxyz" are completed.

FIG. 11 illustrates log data of "appto". In this example, a parameter for "opendb" is set at 10:15 and "appto" is installed at 10:16. At this time, data as illustrated in FIG. 12 is stored in the package management DB 309.

A parameter for "appto" is set at 10:17 and "appto" is started at 10:18. Since parameter "dbpasswd" for "appto" is not set, the error message "could not connect to database" is registered as log data.

In response to this error message, the operator sets parameter "dbpasswd" of "appto" at 10:19. However, due to incorrect spelling of the password, even though "appto" is started again at 10:20, the same error message is output to be registered in the log file 302. In response to this error message, the operator sets a correct parameter at 10:21. Thus, when "appto" is started at 10:22, log data of "[info] starting" is stored. This indicates that the error is resolved. Since the parameter is corrected at 10:21, data as illustrated in FIG. 13 is stored in the configuration DB 305.

As described above, data corresponding to the manipulation performed to install and operate a software package is accumulated in the package management DB 309 and the configuration DB 305.

In the example of FIG. 7, a difference between the contents of the package management DB 309 and the configuration DB 305 when an error occurs at 10:16 and the contents of the package management DB 309 and the configuration DB 305 when the error is resolved at 10:23 is illustrated as handling items from the third row to the eighth row of FIG. 7, and this part is extracted to serve as handling data in this case for the error.

Similarly, in the example of FIG. 11, a difference between the contents of the package management DB 309 and the configuration DB 305 when an error occurs at 10:18 and the contents of the package management DB 309 and the configuration DB 305 when the error is resolved at 10:22 is illustrated as a handling item at the seventh row. The handling item at a fifth row is merged in the configuration DB 305 so as to be hidden. Therefore, the seventh row is extracted to serve as handling data in this case for the error.

The following process is performed based on the characteristic described above, so that handling data applicable to a plurality of devices is extracted to be reused.

First, a process at the server 300 side will be described with reference to FIGS. 14 to 17.

Figure 14:
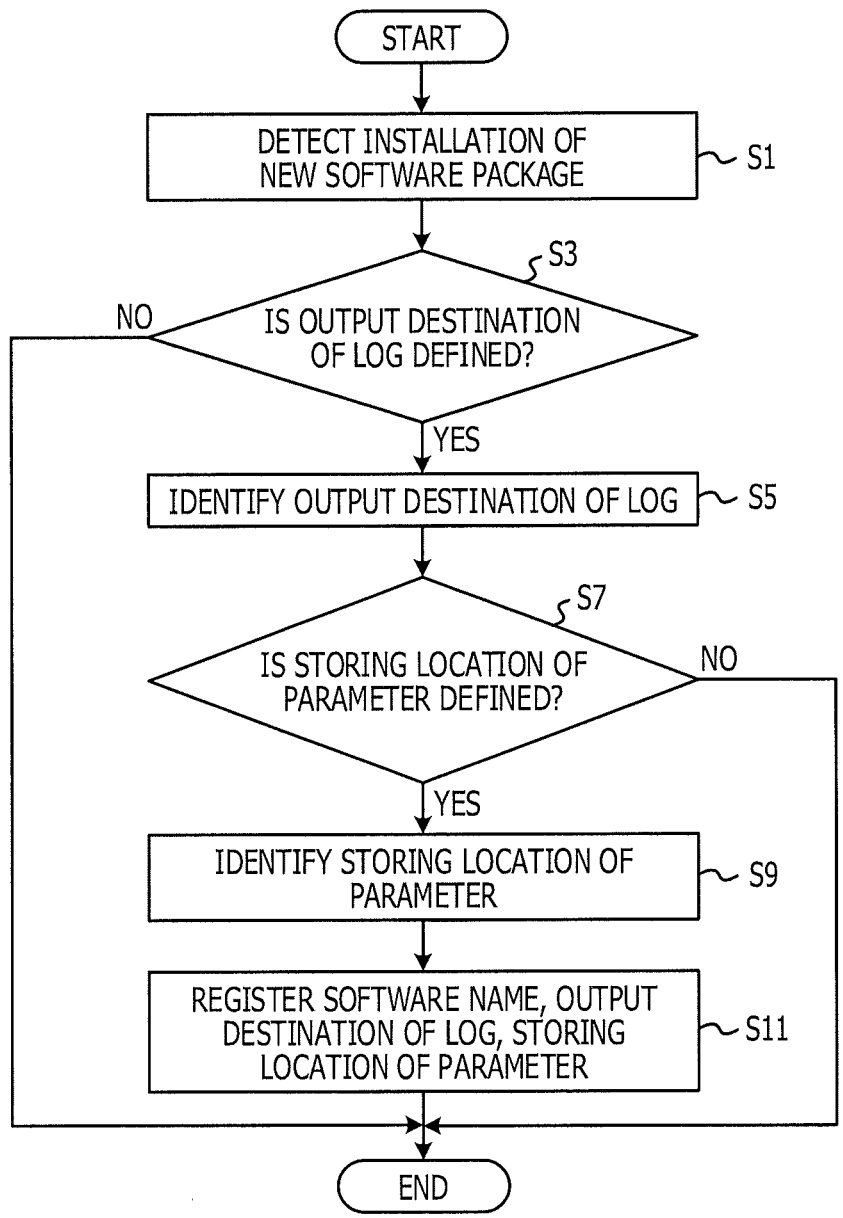
FIG. 14 is a diagram illustrating a flow of a process when a software package is installed.

First, a process of a collecting unit 306 at the time of installing a software package will be described with reference to FIG. 14.

First, the collecting unit 306 detects installation of a new software package, for example, by a notification from a process of the OS (S1). Here, the package management unit 308 also detects the installation of the new software package, for example, by the notification from the process of the OS and registers the new software package in the package management DB 309.

The collecting unit 306 determines whether a log output destination is defined in the package information of the software package (S3). When the log output destination is not defined, configuration data for the software package is not be extracted, so that the process ends. When the log output destination is defined, the collecting unit 306 identifies the log output destination (the log file 302 for example) on the basis of the package information (S5).

Further, the collecting unit 306 determines whether a parameter storing location is defined in the package information (S7). In the present embodiment, when the parameter storing location is not defined, the process ends.

When the parameter storing location is defined, the collecting unit 306 identifies the parameter storing location (the parameter file 303 for example) (S9).

Further, the collecting unit 306 registers the software name, the log output destination, and the parameter storing location in the software management table 307 (S11). The process then ends.

Figure 15:
FIG. 15 is a diagram illustrating an example of a software management table.

For example, an example of the software management table 307 is illustrated in FIG. 15. As described above, in the example of FIG. 5, the software name, the log output destination, and the parameter storing location are stored. With reference to the software management table 307, the collecting unit 306 monitors the log data. The configuration management unit 304 references the parameter file 303 and updates the configuration DB 305 when the parameter file 303 is updated.

Figure 16:
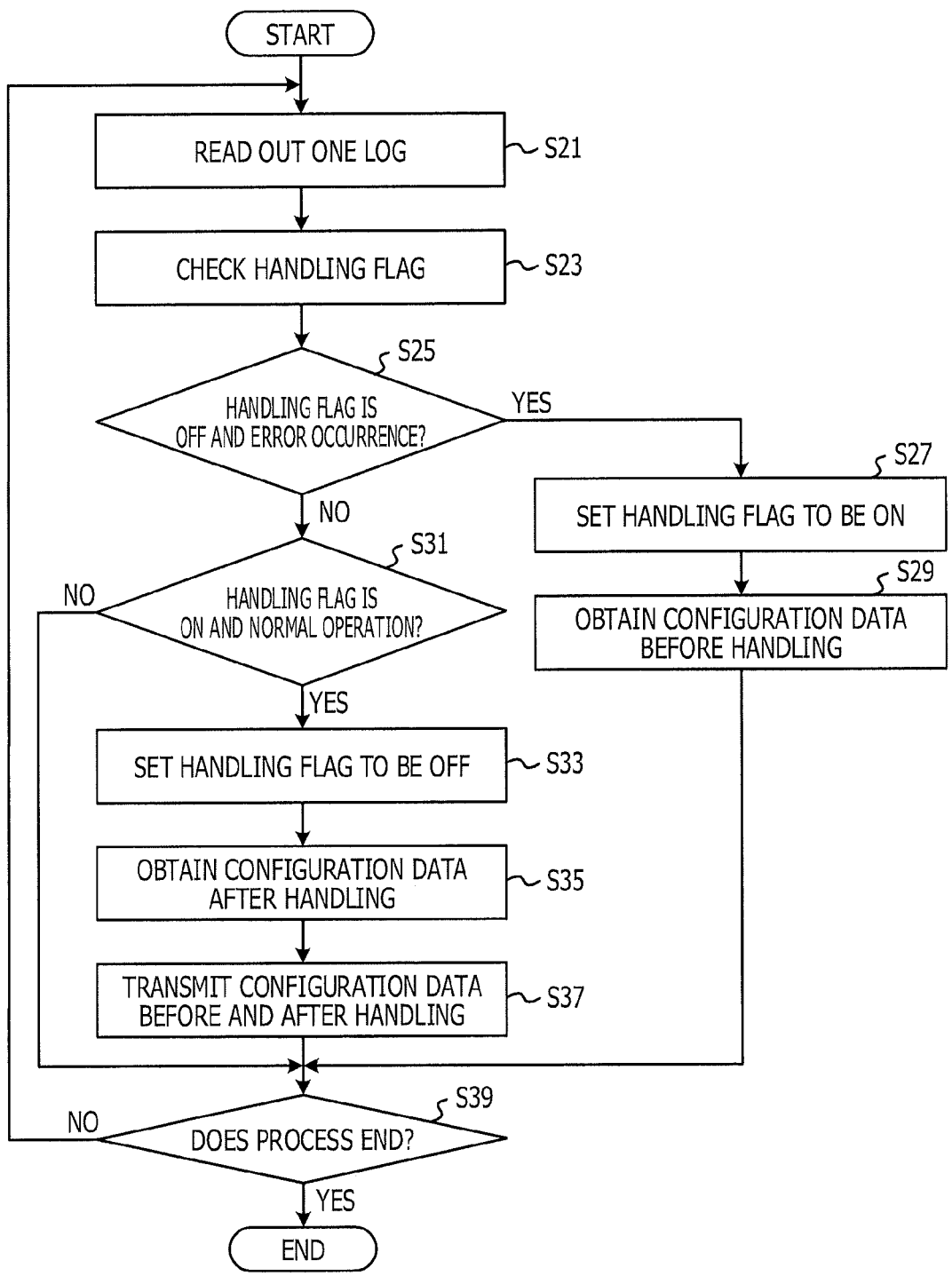
FIG. 16 is a diagram illustrating a flow of a process when an error is detected.

Next, a process will be described for a case when the error is detected with reference to FIG. 16.

The collecting unit 306 reads out unprocessed log data from the log file 302 (S21). For example, the collecting unit 306 reads out log data which is newly registered. The collecting unit 306 checks a state of a handling flag indicating whether an error has been occurred and is not yet resolved (S23).

The collecting unit 306 determines whether an error occurs while the handling flag is OFF with reference to the log data (S25). An occurrence of error is determined based on whether an error message is registered.

When this condition is satisfied, it indicates a case where a new error occurs after resolving an error. Therefore, the collecting unit 306 sets the handling flag to be ON (S27). The collecting unit 306 obtains the configuration data before handling (at the error occurrence) from the configuration DB 305 and the package management DB 309 (S29). Specifically, the collecting unit 306 reads out configuration information at that time from the configuration DB 305 and reads out package management data from the package management DB 309. Then, the process proceeds to S39.

When it is not determined that an error occurs while the handling flag is OFF, the collecting unit 306 determines whether the operation is performed normally while the handling flag is ON with reference to the log data (S31). Whether the operation is performed normally is determined based on whether a predetermined message, such as "[info] starting" in the example described above, is registered. When this condition is not satisfied, the process proceeds to S39.

When it is determined that the operation is performed normally while the handling flag is ON, it is considered that the error is resolved, so that the collecting unit 306 sets the handling flag to be OFF (S33). The collecting unit 306 obtains configuration data after handling (after resolving the error) from the configuration DB 305 and the package management DB 309 (S35). Specifically, the collecting unit 306 reads out configuration information at that time from the configuration DB 305 and reads out package management data from the package management DB 309.

The collecting unit 306 transmits configuration data before and after handling to the operational management server 100 (S37). For example, data as described in FIG. 17 is transmitted to the operational management server 100.

In the example of FIG. 17, a user ID, a server ID, a software name, an error message, configuration data (package management data and configuration information) before handling, and configuration data (package management data and configuration information) after handling are included.

The collecting unit 306 determines whether an instruction to complete the process is issued (S39). When the instruction to complete the process is not issued, the process returns to S21. When the instruction to complete the process is issued, the process ends.

By performing the process as described above, it may be ensured that configuration data when an error occurs and configuration data after resolving the error are obtained and transmitted to the operational management server 100.

Next, a process in the operational management server 100 will be described with reference to FIGS. 18 to 33. First, a specific example as used in the following description will be described.

FIG. 18 is a diagram illustrating an example of configuration data when an error of an error message "missing library" occurs in FIG. 7. Configuration information in the configuration DB 305 will be omitted. FIG. 19 is a diagram illustrating an example of configuration data when the error of the error message "missing library" is resolved. Similarly to FIG. 18, configuration information in the configuration DB 305 will be omitted. A part of package management data in the package management DB 309 enclosed by a bold line is a different part from that at the error occurrence as illustrated in FIG. 18. The configuration data illustrated in FIGS. 18 and 19 is referred to as configuration data of handling 1.

FIG. 20 is a diagram illustrating an example of configuration data when an error of an error message "could not connect to database" occurs in FIG. 7. Configuration information in the configuration DB 305 will be omitted. FIG. 21 is a diagram illustrating an example of configuration data when the error of the error message "could not connect to database" is resolved. With regard to configuration information, only newly added information will be specifically illustrated. A part of configuration information in the configuration DB 305 enclosed by a bold line is a different part from that at the error occurrence as illustrated in FIG. 20. The configuration data illustrated in FIGS. 20 and 21 is referred to as configuration data of handling 2.

FIG. 22 is a diagram illustrating an example of configuration data when an error of an error message "could not connect to database" occurs in FIG. 11. Configuration information in the configuration DB 305 will be partially omitted. FIG. 23 is a diagram illustrating an example of configuration data when the error of the error message "could not connect to database" is resolved. A part of configuration information in the configuration DB 305 enclosed by a bold line is a different part from that at the error occurrence as illustrated in FIG. 22. The configuration data illustrated in FIGS. 22 and 23 is referred to as configuration data of handling 3.

Next, with reference to FIGS. 24 to 33, a process in the operational management server 100 will be described in which handling data is registered in a handling DB 104 or handling data registered in the handling DB 104 is updated.

The receiving unit 101 receives configuration data before and after handling from the server 300 to store the configuration data in the first configuration data storing unit 102

(S41). The configuration data after handling may be stored in the second configuration data storing unit 105 at this time.

The initial handling data generating unit 1031 of the handling data updating unit 103 extracts a difference between the configuration data before and after handling to generate initial handling data (S43).

For example, in the case of handling 1, initial handling data as illustrated in FIG. 25 is generated. In the example of FIG. 25, handling items 1 and 2 corresponding to the difference of the package management data enclosed by a bold line in FIG. 19 are included. In order to distinguish the errors, a software name and an error message are also represented together.

Similarly, in the case of handling 3, initial handling data as illustrated in FIG. 27 is generated. In the example of FIG. 27, handling item 1 corresponding to the difference of the configuration data enclosed by a bold line in FIG. 23 is included. In order to distinguish the errors, a software name and an error message are also represented together.

Further, in the case of handling 2, initial handling data as illustrated in FIG. 26 is generated. In the example of FIG. 26, handling items 1 to 3 corresponding to the difference of the configuration data enclosed by a bold line in FIG. 21 are included. In order to distinguish the errors, a software name and an error message are also represented together.

The first updating unit 1032 of the handling data updating unit 103 determines whether handling data for the same error which occurs in the same software package is already registered in the handling DB 104 (S45).

When this condition is satisfied, the first updating unit 1032 adds a handling item which is not included in the initial handling data but is included in existing handling data to the initial handling data (S47). Then, the process proceeds to S49. When the handling data for the same error which occurs in the same software package has not been registered, the process proceeds to S49.

For example, it is assumed that the initial handling data (FIG. 26) generated based on handling 2 for the error message "could not connect to database" of the software package "appto" is registered in the handling DB 104 at first. Next, it is understood that when the initial handling data (FIG. 27) generated in handling 3 for the same error message in the same software package is generated, handling items 1 and 2 in the existing handling data in FIG. 26 satisfy the condition in S47. Accordingly, handling items 1 and 2 in the existing handling data are added to the initial handling data. That is, the handling data is updated to be data as illustrated in FIG. 28. The configuration data after handling is used in a subsequent process, so that the configuration data (FIG. 23) of handling 3 is maintained, in this example.

Further, it is assumed that the above updated handling data (FIG. 28) is registered and initial handling data of handling 4 as illustrated in FIG. 29 is obtained. It is understood that handling items 1 and 3 in the existing handling data (FIG. 28) satisfy the condition in S47 but handling item 2 does not satisfy the condition in S47. Accordingly, when S47 is performed, handling data is updated as illustrated in FIG. 30. That is, handling items 1 and 4 in FIG. 30 are inserted. The handling items are sorted in the handling data such that the handling items of the same type of component name are lined.

By performing the above processes, a handling item which has not been extracted in a certain status when an error occurs may be added so as to be performed by any devices without omission.

Figure 24:
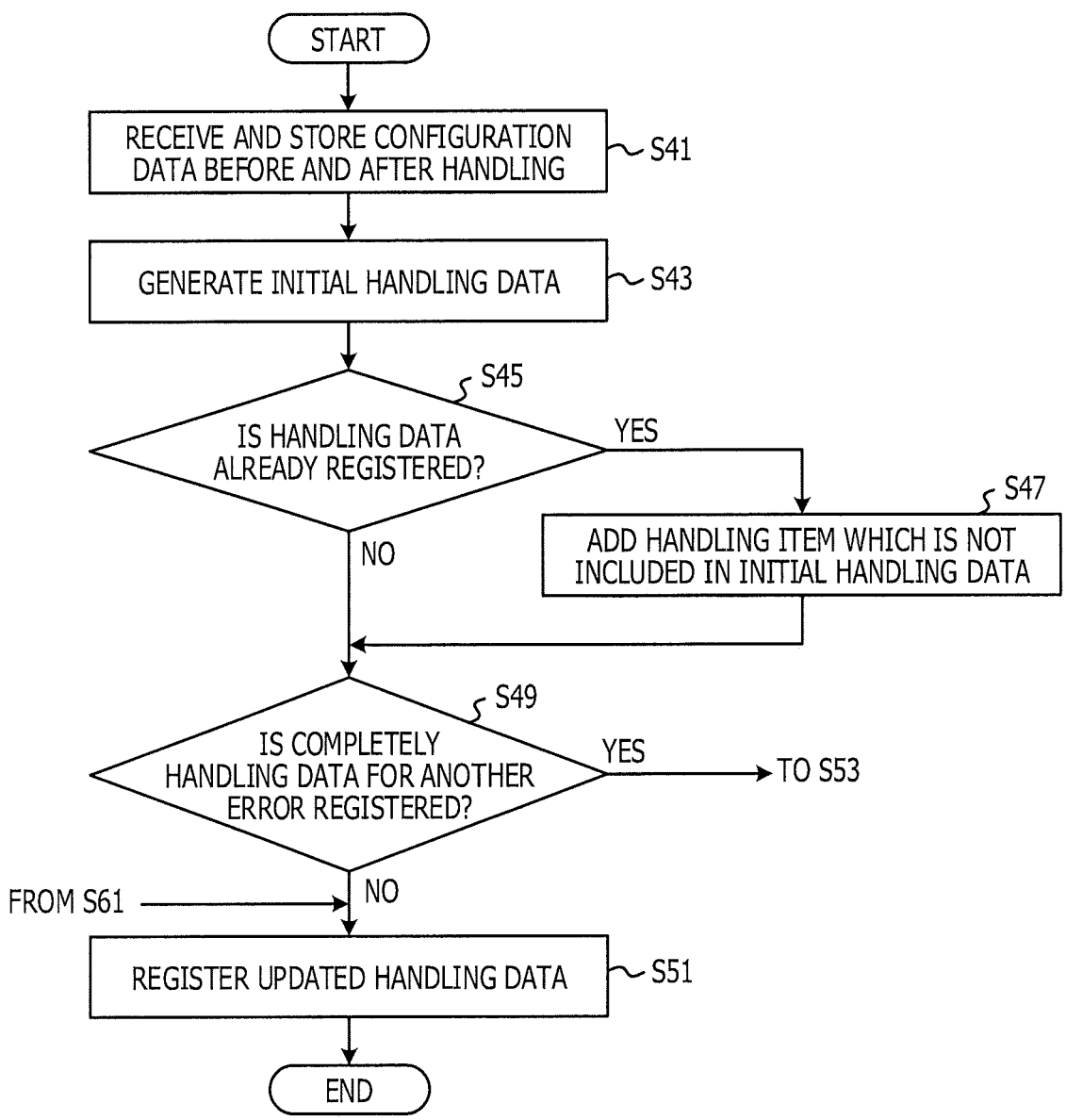
FIG. 24 is a diagram illustrating a flow of a process for updating handling data.

Returning to the description of FIG. 24, the second updating unit 1033 determines whether handling data for another error which occurs in the same software package is already registered (S49). When this condition is satisfied, the process proceeds to S53 of FIG. 31.

When this condition is not satisfied, the handling data updating unit 103 registers the updated handling data (initial handling data itself when nothing is registered for the same software package) in the handling DB 104 (S51). Further, configuration data after handling corresponding to the handling data is also registered in the handling DB 104. The process then ends.

Figure 31:
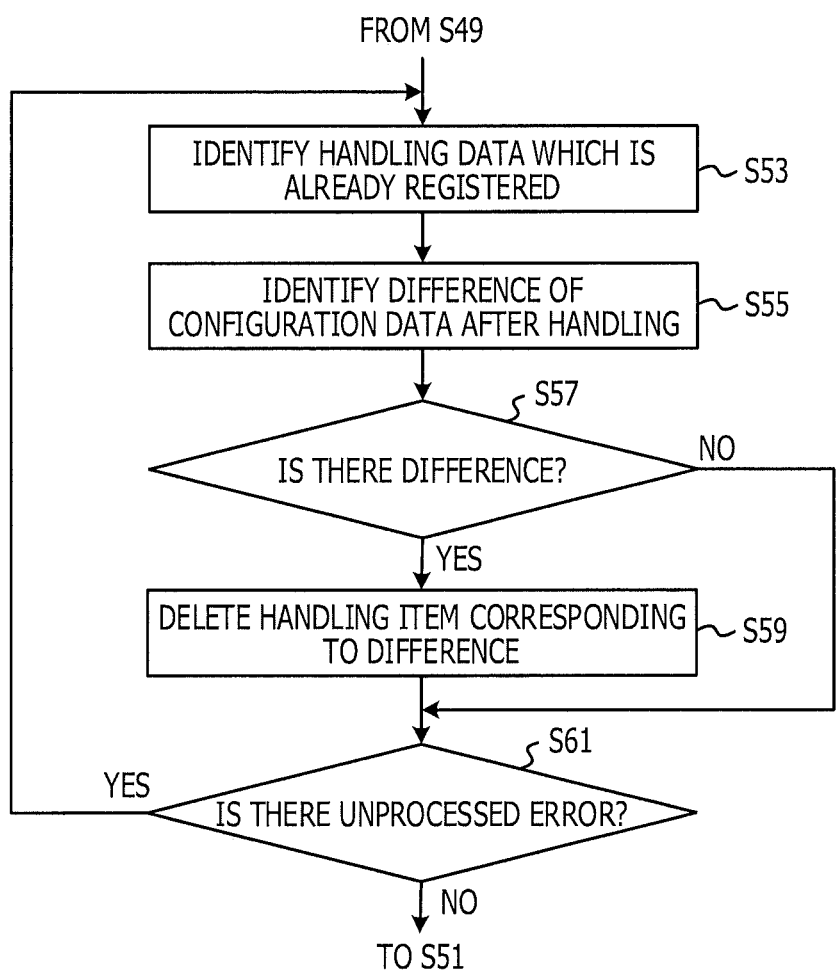
FIG. 31 is a diagram illustrating a flow of a process for updating handling data.

Next, description of the subsequent process will be made with reference to FIG. 31. The second updating unit 1033 identifies handling data which is already registered for an unprocessed error (S53). Since handling data may be registered for a plurality of different errors, for example, handling data which is already registered is processed in the order of registration.

The second updating unit 1033 compares configuration data after handling corresponding to the target handling data with configuration data after handling corresponding to the identified handling data to identify a difference (S55).

For example, it is assumed that the handling data as illustrated in FIG. 28 is the handling data which is already registered and corresponding configuration data after handling is configuration data as illustrated in FIG. 23. It is also assumed that when the handling data (FIG. 25) for handling 1 becomes the target handling data of FIG. 31 as the initial handling data as it is, corresponding configuration data after handling is as illustrated in FIG. 19.

Then, when there is no difference between configuration information as a result of comparison of FIG. 23 and FIG. 19, it is understood that "libabc" is further added to the package management data of the handling 1.

When the difference is not identified in S55, the process proceeds to S61. When the difference is identified in S55, the second updating unit 1033 deletes the handling item corresponding to the identified difference from the handling data (S59). Specifically, in FIG. 25, since handling item 2 is the handling item corresponding to the difference, handling item 2 is deleted and the handling data is updated to handling data as illustrated in FIG. 32. The configuration data is not updated but used as it is.

The second updating unit 1033 determines whether there is an unprocessed error (S61). When there is an unprocessed error, the process returns to S53. When there is no unprocessed error, the process proceeds to S51 of FIG. 24.

By performing the process as described above, handling data commonly applicable in any of the devices is generated.

When a specific value such as a password is included in a handling item, it is not desirable to register the specific value in the handling DB 104 as it is, so that the specific value is parameterized such as "% s" as illustrated in FIG. 33.

Next, a process at the time of searching will be described with reference to FIGS. 34 to 38. It is assumed that handling data as illustrated in FIG. 33 is registered in the handling DB 104 and configuration data as illustrated in FIGS. 34 and 35 is stored in the second configuration data storing unit 105.

The example of FIG. 34 illustrates configuration information of server "i3000" of user "u0700" and the example of FIG. 35 illustrates configuration information of server "14000" of user "u0800". As described above, it is assumed that configuration information when an error occurs is different from each other.

Figure 36:
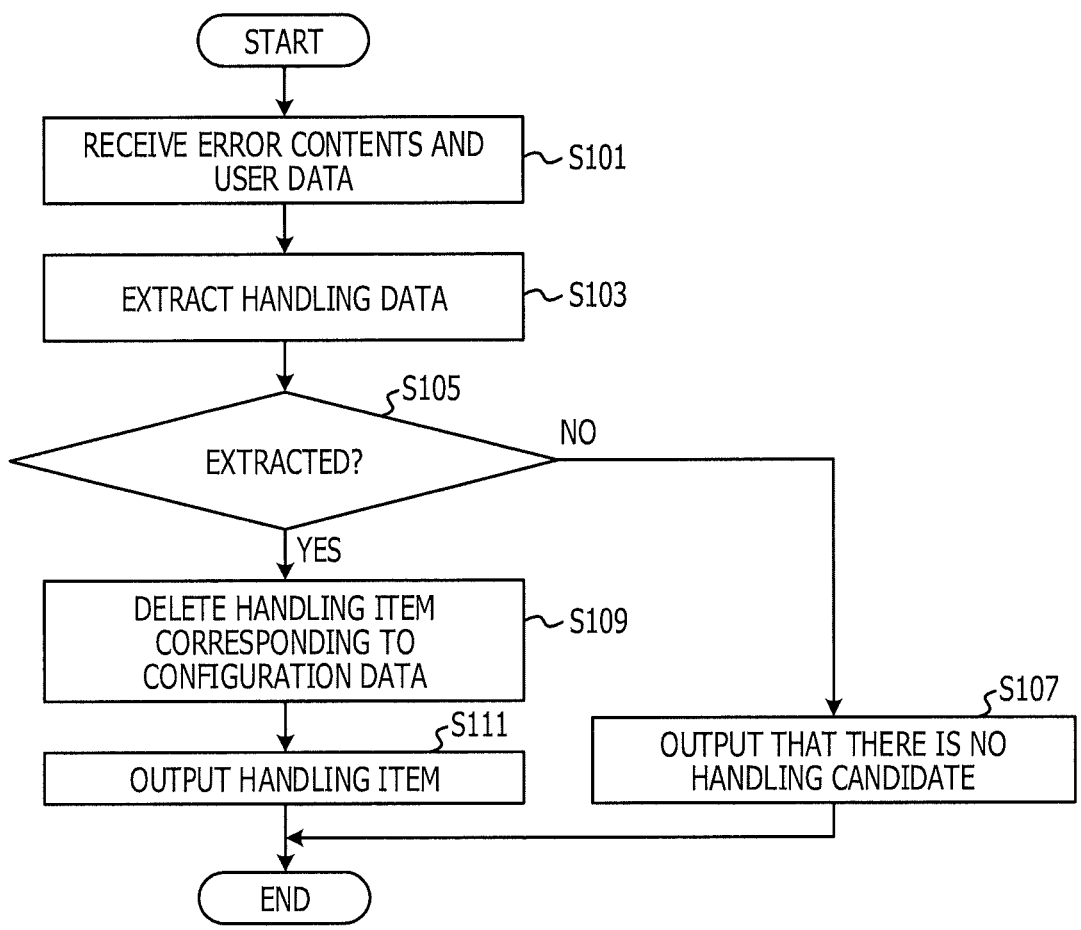
FIG. 36 is a diagram illustrating a flow of a search process.

Process contents will be described with reference to FIG. 36. First, the searching unit 106 receives error contents (a software name and an error message for example) and user data (a user ID and a server ID for example) from the user terminal 400 (S101). If necessary, the configuration data may be received at this time.

The searching unit 106 searches the handling DB 104 using the error contents to extract corresponding handling data (S103). If the handling data is not extracted (No in S105), the searching unit 106 transmits a notice indicating that there is no handling candidate to the user terminal 400 (S107). Then, the process ends.

When the handling data is extracted (Yes in S105), the searching unit 106 deletes, from the extracted handling data, a handling item corresponding to configuration data identified in the second configuration data storing unit 105 by the user data (S109).

The searching unit 106 transmits data which includes the remaining handling items as handling candidates to the user terminal 400 (S111). The user terminal 400 receives the data and displays the received data on a display device.

Figure 37:
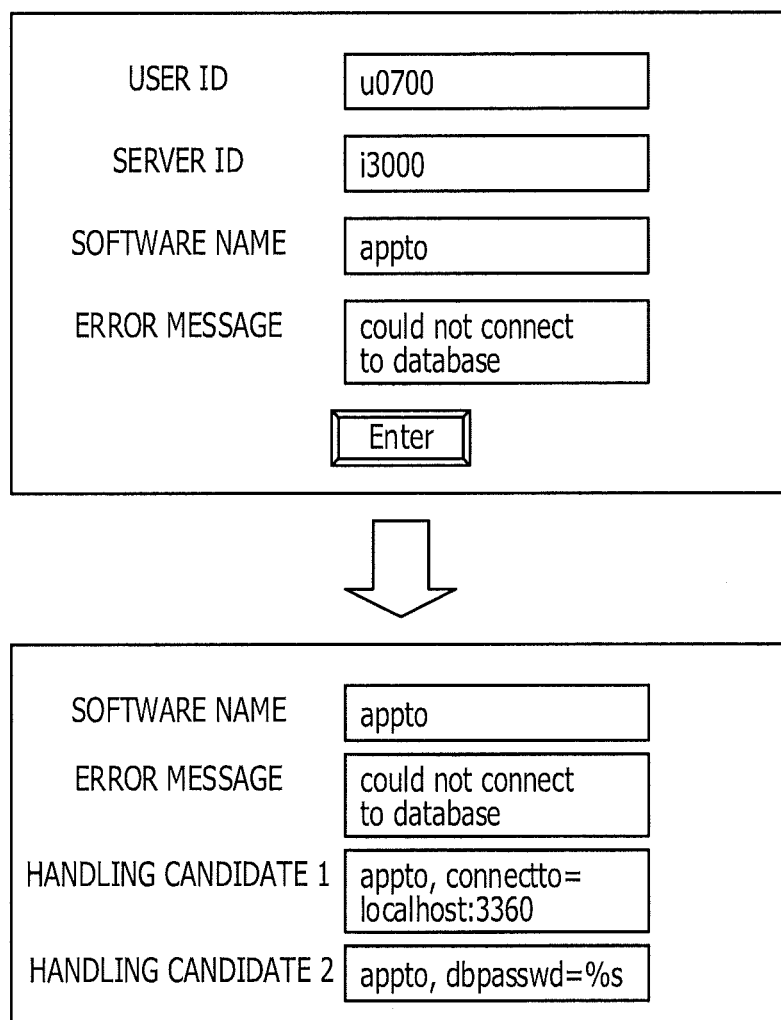
FIG. 37 is a diagram illustrating an example of a handling candidate suggested for a device.

For example, as illustrated at an upper side of FIG. 37, when a search request for a software name "appto" and an error message "could not connect to database" with regard to server "i3000" of user "u0700" is received, the configuration data as illustrated in FIG. 34 is read out. Handling data as illustrated in FIG. 33 is extracted as the handling data. Since it is understood that a setting of a password for "opendb" is completed with reference to the configuration data of FIG. 34, handling item 1 is deleted from the handling data of FIG. 33. Therefore, only handling items 2 and 3 remain. Therefore, as illustrated at a lower side of FIG. 37, handling items 2 and 3 are presented as handling candidates 1 and 2 on the display device of the user terminal 400.

Figure 38:
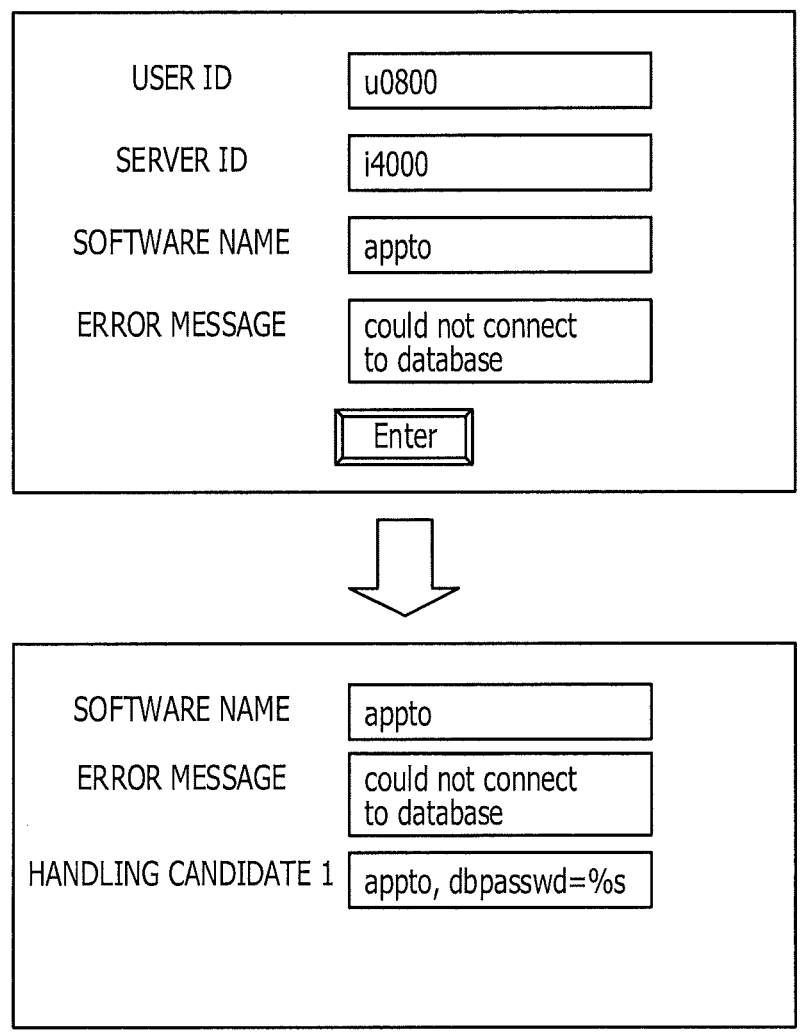
FIG. 38 is a diagram illustrating an example of a handling candidate suggested for a device.

Meanwhile, as illustrated at an upper side of FIG. 38, when a search request for a software name "appto" and an error message "could not connect to database" with regard to server "i4000" of user "u0800" is received, the configuration data as illustrated in FIG. 35 is read out. Handling data as illustrated in FIG. 33 is extracted as the handling data. Since it is understood that a setting of a password for "opendb" is completed and a parameter "connectto" is set for "appto" with reference to the configuration data of FIG. 35, handling items 1 and 2 are deleted from the handling data of FIG. 33. Therefore, only handling item 3 remains. As a result, as illustrated at a lower side of FIG. 38, handling item 3 is presented as handling candidate 1, on the display device of the user terminal 400.

By doing this, an appropriate handling candidate may be presented in accordance with a software package, which is installed by an operator, and a configuration of the device.

The embodiment has been described above, but embodiments are not limited thereto. For example, the functional configuration illustrated in FIGS. 1 and 2 are examples and may not coincide with a program module configuration. Further, if the process result is not changed, an executing order of the processes in the flow may be changed or a plurality of processes may be executed in parallel.

Some processes of the server 300 may be performed by the operational management server 100.

The above-mentioned embodiments are described on the assumption when software is installed, but may be applied to handling for an error during normal operation.

As for the configuration of the operational management server 100, the functions may be distributed into a plurality of computers.

Figure 39:
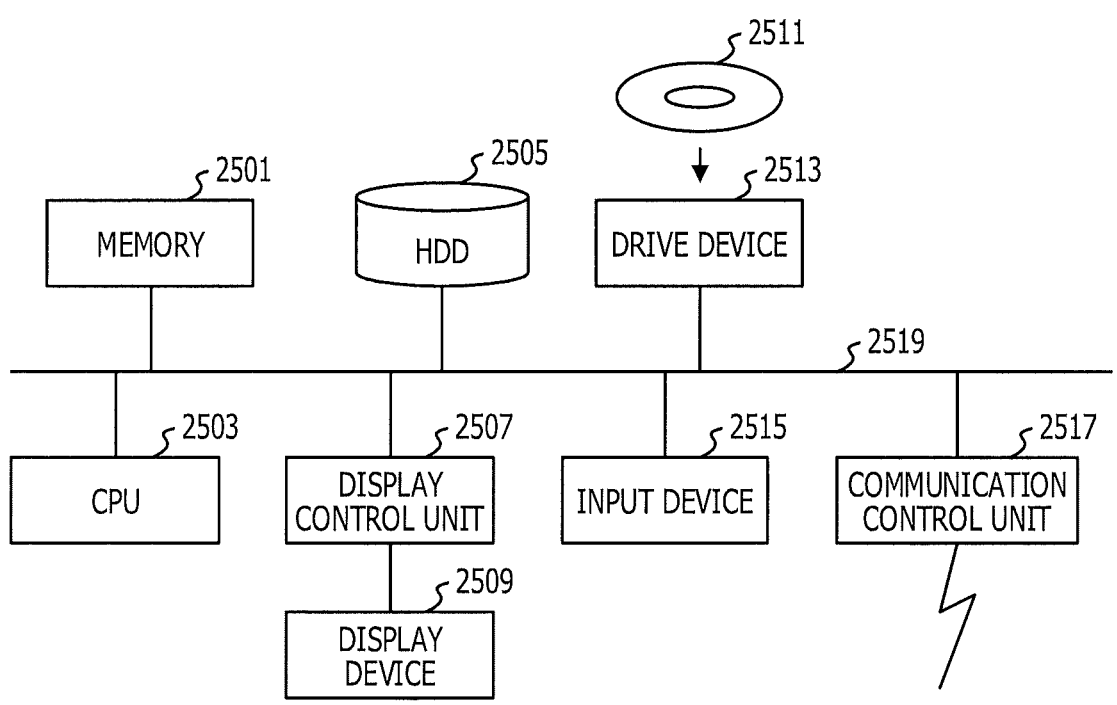
FIG. 39 is a diagram illustrating an exemplary functional configuration of a computer.

The operational management server 100 and the server 300 described above are computer devices. As illustrated in FIG. 39, a memory 2501, a central process unit (CPU) 2503, a hard disk drive (HDD) 2505 and a display control unit 2507 which is connected to a display device 2509, a drive device 2513 for a removable disk 2511, an input device 2515, and a communication control unit 2517 which is connected to the network are connected to one another by a bus 2519. An operating system (OS) and an application program for performing the process according to the embodiments are stored in the HDD 2505 and are read out from the HDD 2505 to the memory 2501 when the OS and the application program are executed by the CPU 2503. The CPU 2503 controls the display control unit 2507, the communication control unit 2517, and the drive device 2513 in accordance with the process contents described in the application program to perform a predetermined operation. Data which is being processed is mainly stored in the memory 2501, but may be stored in the HDD 2505 as well. The application program which performs the above-described process may be stored in the computer readable removable disk 2511 to be distributed and installed from the drive device 2513 into the HDD 2505. The application program may be installed in the HDD 2505 via the network such as the Internet and the communication control unit 2517. Such a computer device implements various functions as described above when hardware such as the CPU 2503 and the memory 2501 described above and a program such as the OS and the application program are organically cooperated.

The embodiments described above will be summarized as follows.

An information processing method according to the embodiments includes: (A) obtaining, from a device having software installed therein, a software identifier for identifying the software, a first error identifier for identifying an error which occurs during installation of the software, prior configuration data of the device at a first time when the error occurs, and posterior configuration data of the device at a second time when the error is resolved; (B) generating new handling data on basis of a difference between the prior configuration data and the posterior configuration data; (C) updating the new handling data on basis of existing handling data, the prior configuration data, and the posterior configuration data to store the updated handling data in a storing unit in association with the software identifier and the first error identifier, the existing handling data being stored in the storing unit in association with the software identifier and including a handling item to be performed for installing the software; and (D) storing, when the existing handling data is not stored in the storing unit, the new handling data in the storing unit in association with the software identifier and the first error identifier.

According to this process, handling data which is commonly applicable to a plurality of devices may be accumulated on the basis of the configuration data.

The process of updating the new handling data described above may include: (c1) updating the new handling data by adding a first handling item to the new handling data, the first handling item being not included in the new handling data but included in first existing handling data stored in the storing unit in association with the software identifier and the first error identifier.

By doing this, handling items may be added without omission.

The process of updating the new handling data described above may further include: (c2) identifying a first difference or a second difference, the first difference being between first posterior configuration data and second posterior configuration data, the first posterior configuration data being related to second existing handling data stored in the storing unit in association with the software identifier and a second error identifier different from the first error identifier, the second posterior configuration data being related to the updated handling data, the second difference being between the first posterior configuration data and third posterior configuration data related to the new handling data, and (c3) deleting a handling item corresponding to the first difference from the updated handling data or a handling item corresponding to the second difference from the new handling data. This allows to delete non-essential handling items The information processing method may further include: (E) receiving a search request including a first software identifier, a second error identifier, and a first device identifier for identifying the device; (F) extracting first handling data associated with the first software identifier and the second error identifier from the storing unit; (G) deleting, from the first handling data, a handling item corresponding to prior configuration data of the device at a time when an error identified by the second error identifier occurs; and (H) outputting the first handling data after the deletion.

By doing this, handling data in accordance with appropriate to the status of the device in which the software is to be installed is presented to an operator, so that efficient handling may be expected.

the first time and the second time may be identified with reference to log data output by execution of the software. By doing this, it is possible to precisely detect when the error occurs and when the error is resolved.

A program which causes a computer to execute the process as described above may be created. The program may be stored in a computer-readable recording medium such as a flexible disk, an optical disk such as a compact disc read-only memory (CD-ROM), an optical magnetic disk, a semiconductor memory (for example, ROM), or a hard disk or a storage device. Data which is being processed is temporarily stored in a storage device such as a random access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
obtaining, from a device having software installed therein, a software identifier for identifying the software, a first error identifier for identifying an error which occurs during installation of the software, prior configuration data of the device at a first time when the error occurs, and posterior configuration data of the device at a second time when the error is resolved;
generating new handling data on basis of a difference between the prior configuration data and the posterior configuration data;
updating the new handling data on basis of existing handling data, the prior configuration data, and the posterior configuration data to store the updated handling data in a storing unit in association with the software identifier and the first error identifier, the existing handling data being stored in the storing unit in association with the software identifier and including a handling item to be performed for installing the software; and
storing, when the existing handling data is not stored in the storing unit, the new handling data in the storing unit in association with the software identifier and the first error identifier.

2. The non-transitory computer-readable recording medium according to claim 1, wherein
the updating includes:
updating the new handling data by adding a first handling item to the new handling data, the first handling item being not included in the new handling data but included in first existing handling data stored in the storing unit in association with the software identifier and the first error identifier.

3. The non-transitory computer-readable recording medium according to claim 2, wherein
the updating includes:
identifying a first difference or a second difference, the first difference being between first posterior configuration data and second posterior configuration data, the first posterior configuration data being related to second existing handling data stored in the storing unit in association with the software identifier and a second error identifier different from the first error identifier, the second posterior configuration data being related to the updated handling data, the second difference being between the first posterior configuration data and third posterior configuration data related to the new handling data, and
deleting a handling item corresponding to the first difference from the updated handling data or a handling item corresponding to the second difference from the new handling data.

4. The non-transitory computer-readable recording medium according to claim 1, the process further comprising:
receiving a search request including a first software identifier, a second error identifier, and a first device identifier for identifying the device;
extracting first handling data associated with the first software identifier and the second error identifier from the storing unit;
deleting, from the first handling data, a handling item corresponding to prior configuration data of the device at a time when an error identified by the second error identifier occurs; and
outputting the first handling data after the deletion.

5. The non-transitory computer-readable recording medium according to claim 1, wherein
the first time and the second time are identified with reference to log data output by execution of the software.

6. An information processing method, comprising:
obtaining by a computer, from a device having software installed therein, a software identifier for identifying the software, a first error identifier for identifying an error which occurs during installation of the software, prior configuration data of the device at a first time when the error occurs, and posterior configuration data of the device at a second time when the error is resolved;
generating new handling data on basis of a difference between the prior configuration data and the posterior configuration data;

updating the new handling data on basis of existing handling data, the prior configuration data, and the posterior configuration data to store the updated handling data in a storing unit in association with the software identifier and the first error identifier, the existing handling data being stored in the storing unit in association with the software identifier and including a handling item to be performed for installing the software; and storing, when the existing handling data is not stored in the storing unit, the new handling data in the storing unit in association with the software identifier and the first error identifier.

7. An information processing apparatus, comprising:

a storing unit; and a processor configured to obtain, from a device having software installed therein, a software identifier for identifying the software, a first error identifier for identifying an error which occurs during installation of the software, prior configuration data of the device at a first time when the error occurs, and posterior configuration data of the device at a second time when the error is resolved, generate new handling data on basis of a difference between the prior configuration data and the posterior configuration data, update the new handling data on basis of existing handling data, the prior configuration data, and the posterior configuration data to store the updated handling data in the storing unit in association with the software identifier and the first error identifier, the existing handling data being stored in the storing unit in association with the software identifier and including a handling item to be performed for installing the software, and store, when the existing handling data is not stored in the storing unit, the new handling data in the storing unit in association with the software identifier and the first error identifier.

\* \* \* \* \*